(12) United States Patent
Levin et al.

(10) Patent No.: US 11,172,606 B2
(45) Date of Patent: Nov. 16, 2021

(54) ROBOTIC LAWNMOWER WITH PASSIVE CLEANING ASSEMBLY

(71) Applicant: MTD PRODUCTS INC, Valley City, OH (US)

(72) Inventors: Shalom Levin, Pardesiya (IL); Ran Zaslavsky, Pardesiya (IL); Eli Shraga, Pardesiya (IL); Naor Egozi, Pardesiya (IL)

(73) Assignee: MTD Products Inc, Valley City, OH (US)

( * ) Notice: Subject to any disclaimer, the term of this patent is extended or adjusted under 35 U.S.C. 154(b) by 319 days.

(21) Appl. No.: 16/318,764

(22) PCT Filed: Jul. 18, 2017

(86) PCT No.: PCT/IB2017/054340
§ 371 (c)(1),
(2) Date: Jan. 18, 2019

(87) PCT Pub. No.: WO2018/015887
PCT Pub. Date: Jan. 25, 2018

(65) Prior Publication Data
US 2019/0239428 A1    Aug. 8, 2019

(30) Foreign Application Priority Data
Jul. 18, 2016 (GB) .................................. 1612433

(51) Int. Cl.
*A01D 34/00* (2006.01)
*A01D 101/00* (2006.01)

(52) U.S. Cl.
CPC ......... *A01D 34/008* (2013.01); *A01D 34/003* (2013.01); *A01D 2101/00* (2013.01)

(58) Field of Classification Search
CPC ........................... A01D 34/008; A01D 34/003
See application file for complete search history.

(56) References Cited

U.S. PATENT DOCUMENTS 2,888,796 A  *  6/1959  Denney ................ A01D 34/003
                                                        56/13.4
2,957,295 A     10/1960  Brown
(Continued)

FOREIGN PATENT DOCUMENTS

DE    2420339 A1    11/1975
DE    3332192 A1     3/1985
(Continued)

OTHER PUBLICATIONS

International Search Report Written Opinion for Appl. No. PCT/IB2017/054340 dated Jan. 25, 2018, pp. 1-9.
(Continued)

*Primary Examiner* — Alicia Torres
(74) *Attorney, Agent, or Firm* — Wegman Hessler

(57) ABSTRACT

A lawnmower which includes a housing, and a passive cleaning assembly for removing detritus from the housing, the passive cleaning assembly being moveably mounted on the housing. The passive cleaning assembly can include a ground-contacting portion, which contacts the ground during use, thereby causing the cleaning portion to move with respect to the housing during movement of the lawnmower. Movement of the lawn mower with respect to the ground causes the cleaning portion of the passive cleaning assembly to move with respect to the housing and to thereby remove detritus from the housing.

31 Claims, 8 Drawing Sheets

(56) References Cited

U.S. PATENT DOCUMENTS

| | | | |
|---|---|---|---|
| 3,008,283 A | 11/1961 | Wood, Jr. | |
| 3,070,941 A * | 1/1963 | Sheppard | A01D 34/63 56/17.5 |
| 3,077,066 A | 2/1963 | Nokes | |
| 3,145,519 A * | 8/1964 | Pearson | A01D 34/71 56/320.2 |
| 3,396,518 A | 8/1968 | Johnson | |
| 3,959,955 A | 6/1976 | Smith et al. | |
| 5,042,242 A | 8/1991 | Evans | |
| 5,062,257 A * | 11/1991 | Morris | A01D 34/77 56/11.1 |
| 5,323,593 A | 6/1994 | Cline et al. | |
| 6,978,590 B1 * | 12/2005 | Graham | A01D 34/73 56/295 |
| 10,285,327 B2 * | 5/2019 | Durchman | A01D 34/003 |
| 2001/0037632 A1 | 11/2001 | Oxley | |
| 2002/0011813 A1 | 1/2002 | Koselka et al. | |
| 2008/0065265 A1 | 3/2008 | Ozick et al. | |
| 2012/0041594 A1 | 2/2012 | Abramson et al. | |
| 2012/0065830 A1 | 3/2012 | Ko | |
| 2012/0174551 A1 | 7/2012 | Hayward | |
| 2013/0145572 A1 | 6/2013 | Schregardus | |
| 2015/0059120 A1 | 3/2015 | Riehl | |
| 2015/0234385 A1 | 8/2015 | Sandin et al. | |
| 2016/0014955 A1 | 1/2016 | Hans | |

FOREIGN PATENT DOCUMENTS

| | | |
|---|---|---|
| DE | 29823263 U1 | 4/1999 |
| DE | 9422358 U1 | 8/2000 |
| EP | 1906205 A1 | 4/2008 |
| EP | 2412219 A1 | 2/2012 |
| EP | 2741160 A1 | 6/2014 |
| FR | 3025064 A1 | 3/2016 |
| GB | 2285905 A | 8/1995 |
| GB | 2295304 A | 5/1996 |
| WO | 20010082766 A2 | 11/2001 |
| WO | 2003103375 A1 | 12/2003 |
| WO | 2013034884 A1 | 3/2013 |
| WO | 201500170967 A1 | 11/2015 |
| WO | 2016096027 A1 | 6/2016 |
| WO | 2016191636 A1 | 12/2016 |
| WO | 2016202290 A1 | 12/2016 |

OTHER PUBLICATIONS

International Preliminary Report on Patentability for Appl. No. PCT/IB2017/054340 dated Jan. 22, 2019.

Examination Report for U.K Patent Application No. GB1612433.1 dated Dec. 13, 2018.

Search Report for U.K Patent Application No. GB1612433.1, claims 1-20 dated Jan. 11, 2017.

Search Report for U.K Patent Application No. GB1612433.1, claims 21-33 dated Jul. 12, 2017.

Search Report for U.K Patent Application No. GB1612433.1, claims 34-52 dated Jul. 6, 2017.

Search Report for U.K Patent Application No. GB1612433.1, claims 53-59 dated Jul. 10, 2017.

Search Report for U.K Patent Application No. GB1612433.1, claims 60-74 dated Jul. 11, 2017.

* cited by examiner

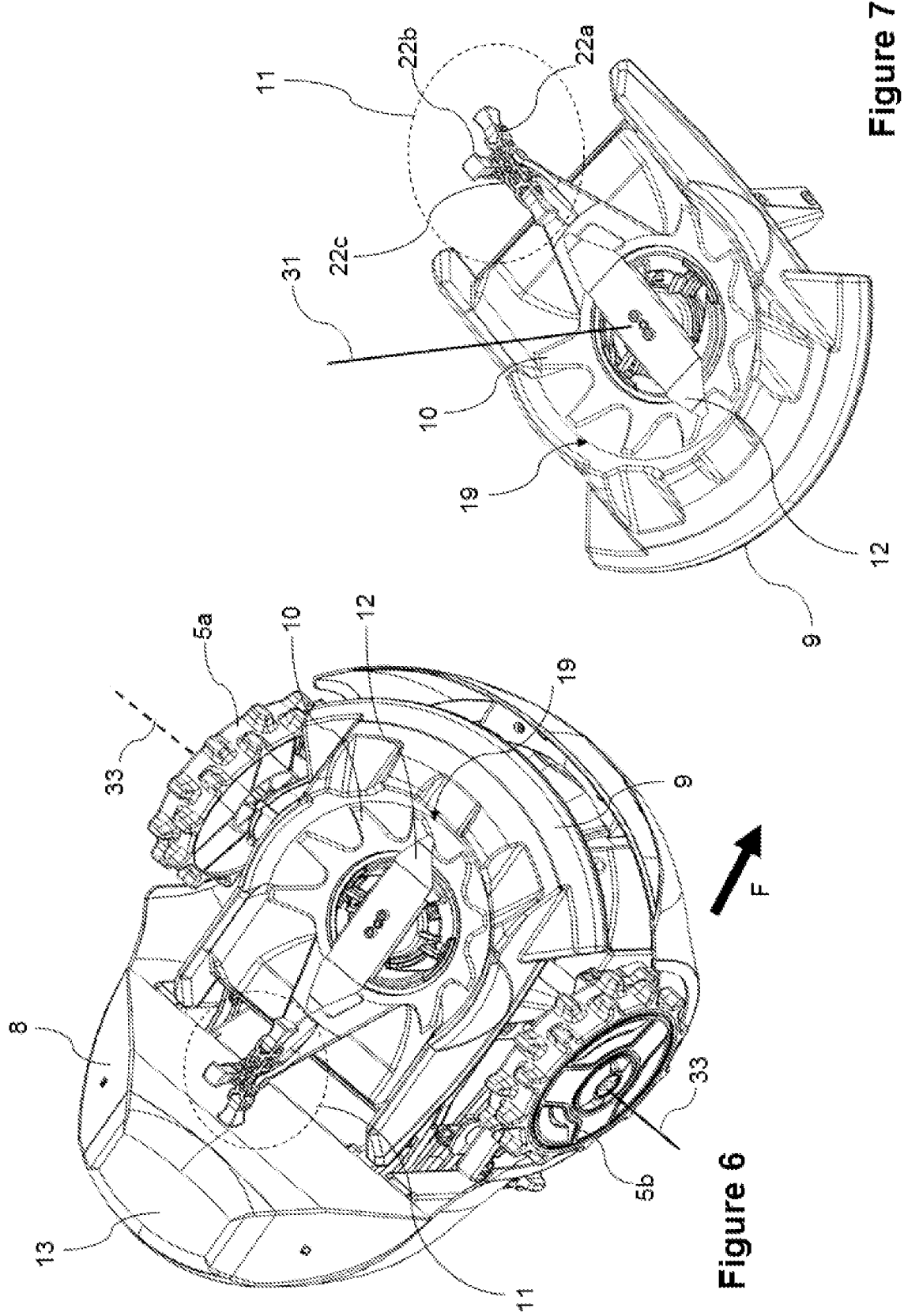

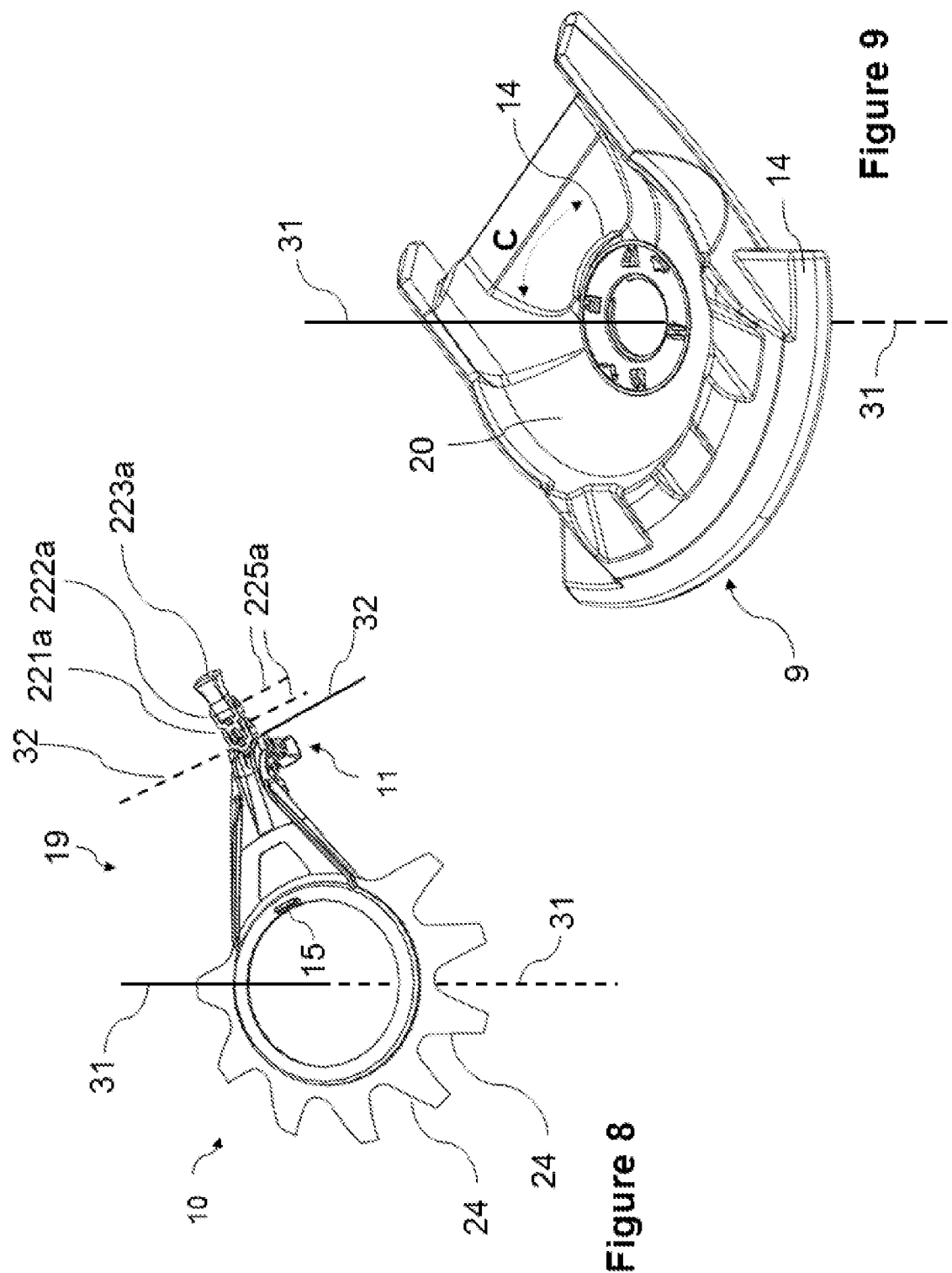

ROBOTIC LAWNMOWER WITH PASSIVE CLEANING ASSEMBLY

CROSS REFERENCE TO RELATED APPLICATION

This application is a national phase of International Patent Application No. PCT/IB2017/054340 filed Jul. 18, 2017, and which claims the priority filing benefit of U.K. Patent Application No. 1612433.1 filed Jul. 18, 2016, which are incorporated herein by reference in their entirety.

TECHNICAL FIELD

The present invention relates to home robotics in general and to robotic lawnmowers in particular; it also relates, in some aspects, to lawnmowers generally, as well as robotic lawnmowers.

BACKGROUND

The use of automated devices is widespread nowadays, and finds countless applications. By their very nature, autonomous machines such as robots represent a significant labour-saving for consumers. Repetitive and time-consuming tasks may now be carried out without significant supervision or instruction by the user of such autonomous machines.

Robotic lawnmowers are a particularly commercially successful example of such an autonomous moving machine, substantially reducing the time and effort required on the user's part in order to maintain a neatly-kept lawn.

A number of robotic lawnmowers are currently available to the consumer, such as the RC and RS series from Robomow™. However, in many respects, robotic lawnmowers have not yet been perfected and improvements may still be achieved, for example in terms of reliability, ease of use and/or efficiency.

SUMMARY

Aspects of the invention are set out in the appended claims.

The following disclosure, in one aspect, describes a lawnmower that comprises: a housing; and a passive cleaning assembly for removing detritus from the housing, the passive cleaning assembly being moveably mounted on said housing. Movement of the lawnmower with respect to the ground causes a cleaning portion of the passive cleaning assembly to move with respect to the housing and thereby remove detritus from the housing In a further aspect, the following disclosure describes a lawnmower comprising: a housing; and a cleaning assembly for removing detritus from the housing, the cleaning assembly being moveably mounted on said housing. The lawnmower is configured such that, during use, the cleaning assembly is moved with respect to the housing thereby causing a scraping edge of a cleaning portion of the cleaning assembly to move with respect to the housing and thereby scrape detritus off the housing.

In a still further aspect, the following disclosure describes a robotic lawnmower comprising: two driven wheels for moving the lawnmower over the lawn; and a sliding member having a ground-engaging surface that is positioned so as to face towards and to slide over the ground during such movement of the lawnmower over the lawn. The sliding member and the two driven wheels are positioned at opposing ends of the lawnmower such that the sliding member and the two driven wheels support respective portions of the lawnmower's weight.

In yet a further aspect, the following disclosure describes a robotic lawnmower comprising: a housing; a plurality of ground-contacting members, which during use each contact the ground over a ground contact region, the ground-contacting members thereby supporting the housing above the ground, at least some of said ground-contacting members being driven so as to move relative to the housing and to the ground thereby propelling the lawnmower over the ground, a ground contact footprint being defined by the polygon bounding all of said ground contact regions. The lawnmower further comprises at least one grass cutting blade, each of which is driven by the lawnmower so as to move with respect to the housing, thereby sweeping out a respective cutting area beneath the housing. At least part of one or more of the cutting areas is beyond the perimeter of said ground contact footprint.

BRIEF DESCRIPTION OF THE DRAWINGS

Reference is now directed to the drawings, in which:

FIG. 6 is a perspective view of the underside of the robot of FIGS. 2 to 5, which illustrates the relative disposition of a housing, a cleaning assembly, a sliding member, a cutting blade, and two driven wheels of the robot;

FIG. 7 is a detail view of the relative disposition of the housing, the cleaning assembly, and the cutting blade illustrated in FIG. 6;

FIG. 8 is a detail view of the cleaning assembly illustrated in FIG. 6;

FIG. 9 is a detail view of the housing illustrated in FIG. 6;

DETAILED DESCRIPTION OF THE DRAWINGS

Overview

Figure 1:
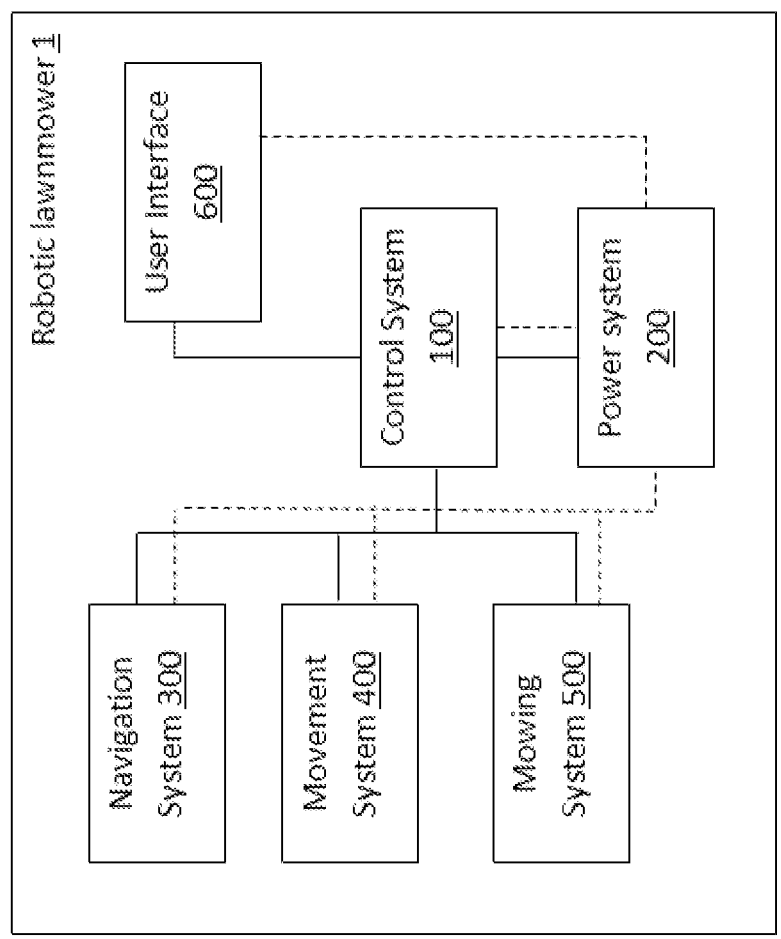
FIG. 1 illustrates schematically an example of a robotic lawnmower and the systems thereof.

Turning first to FIG. 1, there is shown schematically an example of a robotic lawnmower 1, in which various concepts disclosed herein may be employed, and details the systems included in such a robotic lawnmower. As is shown in the drawing, the robot 1 includes: a movement system 400, for moving the robot over the surface of the ground; a navigation system 300, to enable the robot to navigate around a working area, such as a portion of, or the whole of, a lawn; a mowing system for mowing the lawn (or portions thereof); a power system 200, for powering the various systems, components etc. within the robot 1; a control system 100, for communicating with and controlling the systems of the robot 1; and a user interface 600, enabling the user to input commands, information and the like to control the robot's operation and providing an indication to the user of the robot's current state.

The control system 100 may, for example, include a main board, and all electronics, as hardware, software and combinations thereof and other components, necessary for the robot 1 to perform all of its operations and functions (known as the main board electronics). The main board may include one or more processors as part of the main board electronics.

As indicated in the drawing with solid lines, the navigation, movement, power, mowing and user interface systems are in data communication with the control system, so that the control system can receive data from and/or send instructions to these systems.

As shown by dotted lines in FIG. 1, the power system 200 is electrically connected to the control 100, navigation 300, movement 400 and mowing 500 systems, and the user interface 600, so as to supply electrical power to these systems and their components.

The power system 200 may, for example, include: an internal power source (typically rechargeable), including for instance one or more batteries; battery voltage sensors, typically for each battery, that enable the robot to determine when the power source is running low; and charging contacts, that enable connection to an external power source (which may, for example, be provided at a docking station) so as to allow the internal power source to be charged.

The robot 1 may be designed such that it can be received by a docking station (not shown) which the robot 1 will return to once its task is complete (e.g. for orderly control and arrangement of the robot), and/or when its internal power source is running low. While in this docking station, various functions can occur, such as battery recharging, communication of operating data and the like.

The navigation system 300 may include a number of sensors that enable the robot to navigate around the working area of the ground, when moving using the movement system 400. Such sensors may, for example, include:
  sensors operable to determine the robot's position relative to the boundary of the area within which it is operating (for example: coils for sensing a magnetic field induced by a wire loop delimiting the area that transmits an alternating current; range finders, such as ultrasonic or laser range finders, which can measure a distance from a hard delimiter such as a fence or wall; 2D or 3D machine vision systems that can evaluate a distance to marked or natural delimiters);
  sensors operable to sense the relative motion of the robot (e.g. odometers, accelerometers, gyroscopes, magnetometers and the like, for example provided in an inertial measurement unit); and
  sensors operable to determine the robot's absolute position within the area (e.g. satellite navigation system receivers, local positioning system receivers, cameras or other sensor arrays).

It should be noted that sensors may fall into several of these categories.

The movement system 400 may include driven wheels, continuous tracks and the like, which are driven by one or more motors provided within the lawnmower, so as to move the lawnmower over the lawn.

The mowing system 500 may include one or more mowing blades driven by one or more motors so that the robot can cut the grass.

Turning now to the user interface 600, as noted above, this may enable the user to input commands, information and the like to control the robot's operation and may provide an indication to the user of the robot's current state. Accordingly, it may include a number of controls, such as buttons, dials and the like, and a number of indicators, such as a display screen, LEDs and the like, or a combination of both, such as a touchscreen. It may also include a wireless communication link, so as to connect with a user device, such as a smart-phone, tablet device, laptop, PC etc.

Attention is now directed to FIGS. 2 to 11, which illustrate a more specific example of a robotic lawnmower 1, in which various concepts disclosed herein are embodied. The robotic lawnmower includes control 100, power 200, navigation 300, movement 400, and mowing 500 systems and a user interface 600, which generally interact in the manner described above with reference to FIG. 1.

Figure 3:
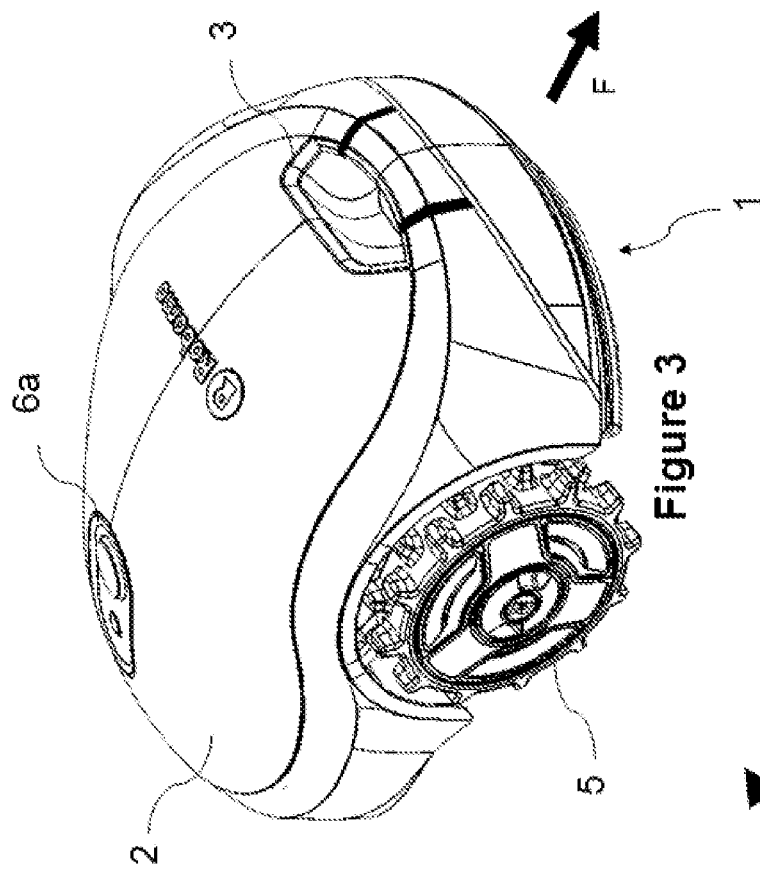
FIG. 3 is a perspective view of the front of the robot of FIG. 2.
Figure 2:
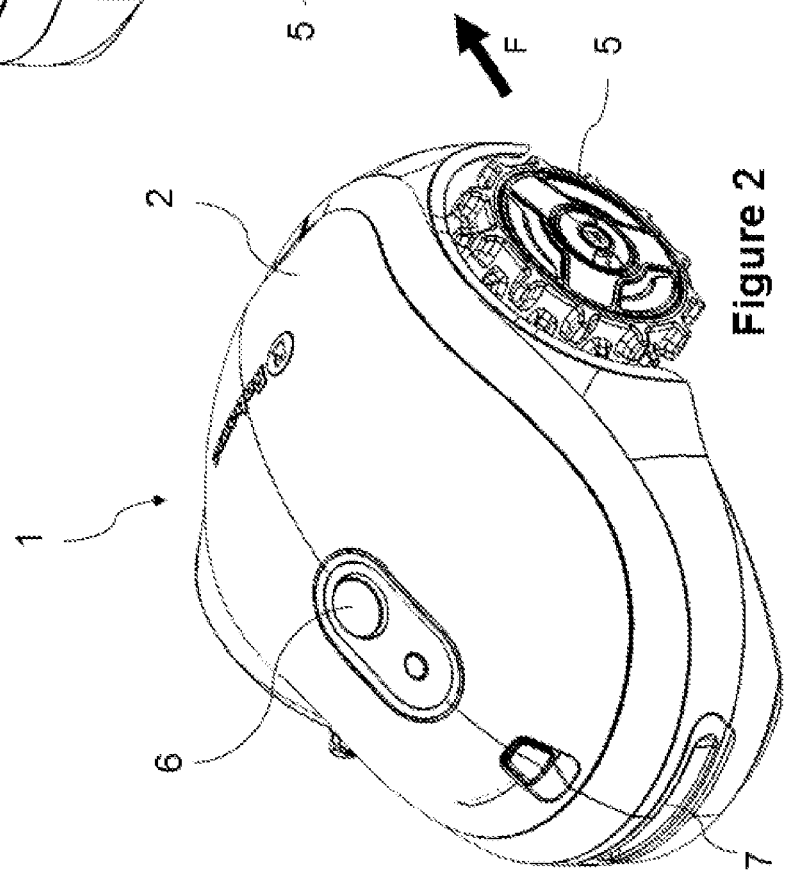
FIG. 2 is a perspective view of the back of a robotic lawnmower in which various concepts disclosed herein are embodied.

FIGS. 2 and 3 show, respectively, views of the back and front of the robotic lawnmower 1. As may be seen from these figures, the lawnmower 1 includes a housing 2 that is supported above the ground by wheels 5 linked to respective drive motors (not shown) within the housing 2. The housing 2 supports and/or contains many of the components of the lawnmower 1. The wheels 5 and drive motors form at least part of the movement system 400 for the robotic lawnmower 1.

As may be also seen from FIGS. 2 and 3, the lawnmower 1 includes a carrying handle 3 provided on the housing 2, with which the lawnmower 1 can be lifted off the ground, and a play/pause button 6 with which the user may interact with the robot and which thus forms a part of the user interface 600 for the lawnmower 1. For example, when the user presses the play/pause button 6, the robot may switch between a paused state, where it remains stationary, and an active state, where it operates according to a previously-selected one of a number of active modes (e.g. a return to charging station mode, a working mode, where it mows the lawn etc.).

Figure 5:
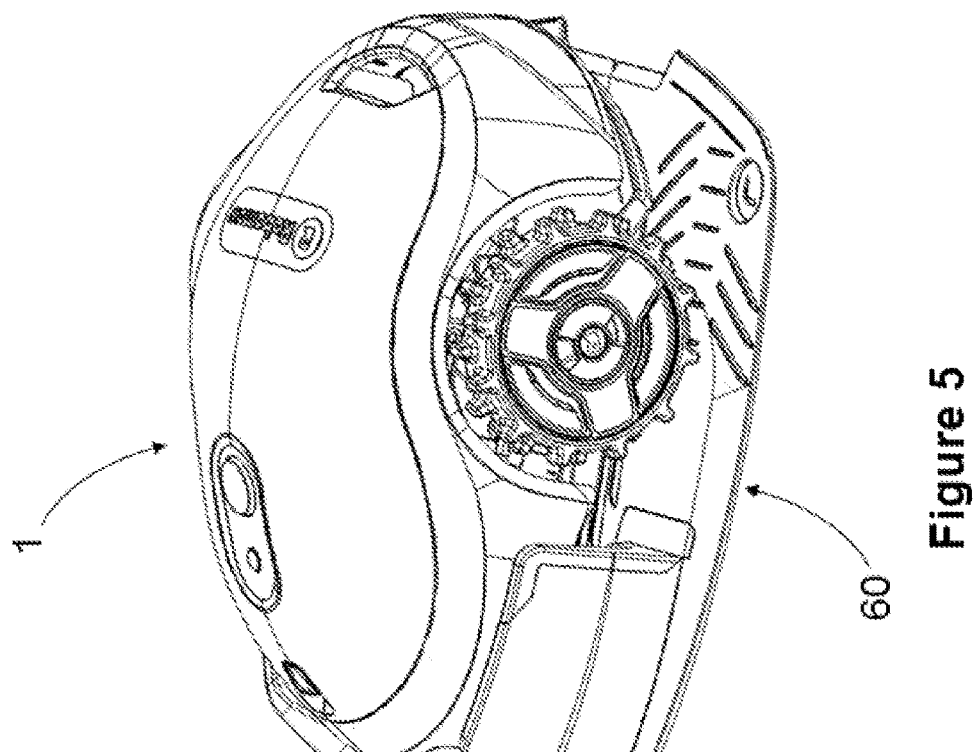
FIG. 5 is a perspective view of the robot of FIG. 2 docked at the charging station shown in FIG. 4.
Figure 4:
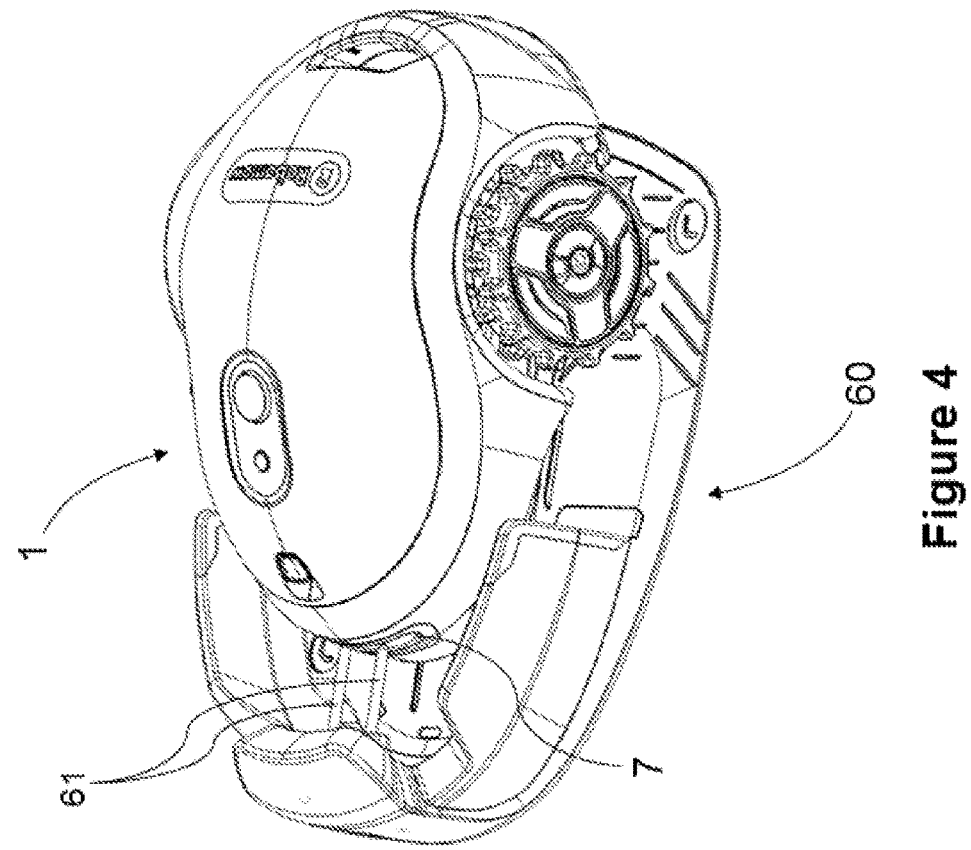
FIG. 4 is a perspective view of the robot of FIG. 2 approaching a charging station.

As is shown in FIG. 2, the lawnmower further includes a slot 7 at its rear end (with respect to its forwards direction of movement, indicated by arrow F). At each end of this slot 7 there is provided a corresponding hole that is configured to receive a charging pin 51; a respective charging contact is located within each hole to electrically connect the power system 200 of the robot 1 with the charging pins 51. Such charging pins 61 may, for example, be provided on a charging station 50, so that when the robot 1 docks at the charging station 60 it may recharge its internal power supply. FIGS. 4 and 5 illustrate, respectively, the robot 1 approaching a charging station 60 and the robot 1 docked at the charging station 50. As is apparent from a comparison of FIGS. 4 and 5, as the robot docks at the charging station the charging pins 61 are inserted into the holes provided within slot 7. An electrical connection is thereby made between the charging station 60 and the robot 1, with the robot thereby being able to recharge its internal power supply.

It will of course be understood that the user interface 600 may include further additional elements, as discussed above with reference to FIG. 1; moreover, in some cases, the user interface 600 may not include such a play/pause button 6.

FIG. 6 shows a perspective view of the underside of the robotic lawnmower 1 of FIGS. 2 and 3. As can be seen from this figure, the lawnmower 1 includes wheels 5a and 5b disposed on two opposing sides of the housing 2. More particularly, the wheels 5a and 5b are spaced apart along a wheel axis 33 and may be driven independently by respective drive motors (not shown) so that they rotate about the wheel axis 33 thereby propelling the lawnmower 1 along the ground. As the wheels are driven independently, the control system 100 of the robot is able to cause them to revolve at different rates, in order for the robot to carry out turning movements. The control system 100 is also able to cause the wheels 5a, 5b to revolve at the same rate, in order for the robot to move forwards (or backwards) along a straight line.

While the movement system 400 for the robot 1 is therefore capable of driving the robot in both a forwards direction (indicated by arrow F) and a backwards direction (as well as being capable of carrying out turning movements), it should be understood that the robot (for example, the control system 100 thereof) may be programmed such that the robot preferentially drives in the forwards direction.

As may also be seen from FIG. 6, the housing 2 further includes a ground-facing portion 9. In the particular example shown, the ground-facing portion 9 is configured as a mowing deck and therefore supports grass cutting blade 12 and its associated motor (not shown). During use, the grass cutting blade 12 is rotated at high speed by the motor, so as to cut an area of the lawn beneath the lawnmower 1. The grass cutting blade 12 and associated motor therefore form at least part of the mowing system 500 for the lawnmower 1.

Such a mowing deck 9 may be moveably suspended from the main part of the housing. More particularly, it may be moveably suspended such that it moves with respect to the housing depending on the height of the grass, the grass cutting blades being coupled to the mowing deck so as to move therewith with respect to the housing. The mowing deck 9 may accordingly include ground contacting portion that, during use of the lawnmower, rests on the ground. In the specific construction shown in FIGS. 6 and 7, this ground contacting portion is a smooth lip at the outside edge of the mowing deck 9. The ground contacting portion may, in some cases, act to set the position (e.g. the height) of the mowing deck with respect to the main part of the housing.

In the specific construction shown in FIGS. 6 and 7, the ground-facing portion/mowing deck 9 is coupled to the remainder of the housing 2 via a parallelogram linkage so that it can move up or down whilst remaining parallel to the ground plane, and can also be balanced by springs, in order to minimize its ground pressure. An example of such a parallelogram linkage mechanism is described in WO 99/45757. The parallelogram linkage may reduce the drag of the mowing deck 18 on the lawn, thus reducing its influence on the lawnmower's maneuverability. However, it will be appreciated that other arrangements for mounting the mowing deck 18 may be used. For example, the mowing deck might be suspended from the remainder of the housing 2 using springs, or might be simply attached to the remainder of the housing 2.

Passive Cleaning Assembly

During use of a robotic lawnmower—and indeed lawnmowers more generally—detritus such as mulch, dirt and the like tends to accumulate on the housing of the robotic lawnmower. This may lead to reduced efficiency for the robot, since such detritus may cause increased resistance to movement of the blade and/or the robot itself. Moreover, should large lumps of accumulated detritus suddenly detach, there is a risk that the robot becomes stuck on these; thus the accumulation of detritus may impact upon the reliability of the robot.

It is therefore envisaged to provide a robotic lawnmower that comprises a housing and a passive cleaning assembly for removing detritus from the housing. In some embodiments the housing may be generally bowl shaped. In some embodiments it also envisaged that the cleaning assembly may be generally bowl shaped.

The passive cleaning assembly is moveably mounted on the housing. More particularly, movement of the lawnmower with respect to the ground causes a cleaning portion of the passive cleaning assembly to move with respect to the housing and thereby remove detritus from the housing.

The robotic lawnmower shown in FIG. 6 includes an example of such a passive cleaning assembly 19. Reference is directed to FIGS. 7 to 9, which show in further detail this example of a cleaning assembly 19 and in which: FIG. 7 is a detail view of the arrangement of the housing 2, the cleaning assembly 19, and the cutting blade 12 illustrated in FIG. 6; FIG. 8 is a detail view of the cleaning assembly 19 illustrated in FIG. 7; and FIG. 9 is a detail view of a ground-facing portion 9 of the housing 2 of the robot.

The particular example of a cleaning assembly 19 shown in FIGS. 6 to 9 includes, in addition to a cleaning portion 10 (which, as noted above moves with respect to the housing 2, thereby removing detritus from the housing), a ground-contacting portion 11, which contacts the ground during use, thereby causing the cleaning portion 10 to move with respect to the housing 2 during movement of the lawnmower. This ground-contacting portion 11 may be adapted to contact the ground at the rear of the lawnmower 1 with respect to its forward direction of movement (indicated by arrow F in the drawings).

In more detail, the particular example of a cleaning assembly 19 shown in FIGS. 6 to 9 is rotatably mounted on the housing 2. The cleaning assembly is thus able to rotate about a cleaning assembly axis 31, shown clearly in FIGS. 7 to 9. As is apparent, the axis about which the grass cutting blade 12 rotates is substantially aligned with this cleaning assembly axis 31. This may provide a particularly compact arrangement, as there is little risk of interference between the movement of the grass cutting blade 12 and movement of the cleaning portion 10. As is also apparent from FIGS. 7 to 9, the cleaning assembly axis 31 is substantially normal to the ground.

With the particular example of a cleaning assembly 19 shown in FIGS. 6 to 9, as the robotic lawnmower 1 moves around the lawn, only certain movements of the lawnmower 1 with respect to the ground cause the cleaning portion 10 of the passive cleaning assembly 19 to rotate with respect to the housing 2 (thereby removing detritus from the housing 2). Specifically, only turning movements of the lawnmower 1 cause the cleaning portion 10 to move with respect to the housing 2. By contrast, when the lawnmower 1 moves along a straight line (forwards or backwards) the cleaning portion 10 of the passive cleaning assembly 19 does not move with respect to the housing 2.

The ground-contacting portion 11 may be configured such that the amount of friction between itself and the ground is substantially greater when the robot 1 carries out turning movements, as compared with when the robot 1 carries out straight-line movements. Accordingly, in the particular example shown in FIGS. 6 to 9, the ground-contacting portion 11 includes a number of chains 22a, 22b, 22c which contact the ground during movement of the robot 1. As the ground-contacting portion 11 shown in FIGS. 6 to 9 is adapted to contact the ground at the rear of the lawnmower 1 with respect to its forward direction of movement (indicated by arrow F in the drawings) it might be compared with a "tail" for the robot 1.

Each of the chains is articulated such that it can only bend only in a vertically oriented plane. In the specific example shown in FIGS. 6 to 9, where the cleaning assembly 19 is rotatably mounted on the housing 2 about cleaning assembly axis 31, each chain is articulated such that it can bend only in a plane defined by the (vertical) cleaning assembly axis 31 and by a direction that extends generally radially with respect to the cleaning assembly axis 31.

In any case, when the robot moves over the ground in a straight line in the forwards direction, the articulated chains 22a, 22b, 22c are dragged over the lawn, flexing so as to accommodate the movement. Thus, a small amount of friction between the chains 22a, 22b, 22c and the ground may be expected. By contrast, when the robot 1 carries out a turning movement, the chains 22a, 22b, 22c are unable to bend or flex to accommodate this movement and thus provide substantially greater resistance to movement or friction. This, in turn, leads to the movement of the cleaning assembly 19 with respect to the housing 2 and thereby the cleaning of detritus from the housing 2 using cleaning portion 10.

FIG. 8 illustrates further details of the configuration of each articulated chain 22. As may be seen from the drawing, each chain 22 includes a number of links (it being noted that in FIG. 8 only the links 221a, 222a, 223a for chain 22a are specifically identified). Each link 221, 222, 223 is pivotally coupled with the next link 221, 222, 223 in the articulated chain 22 so as to permit rotation about a respective axis (the axes being indicated generally as 225). As is apparent from FIG. 8, the links 221, 222, 223 are configured such that the link axes 225 for all the links 221, 222 within an articulated chain 22 are parallel. Furthermore, each articulated chain 22a, 22b, 22c is pivotally coupled to the rest of the cleaning assembly 19 thereby allowing each of the articulating chains 22a, 22b, 22c to rotate about an axis that is radially offset from and circumferentially directed with respect to the cleaning assembly axis 31 and that is parallel to the axes of rotation 225 of its links 221, 222, 223. In the particular arrangement of FIG. 8, all of the articulated chains 22a, 22b, 22c are pivotally coupled to the remainder of the cleaning assembly 19 so as to permit rotation about a common axis 32, which may provide a compact structure.

It should be appreciated that the inclusion of articulated chains is simply one way of configuring the ground-contacting portion such that it provides a greater friction between itself and the ground when the robot 1 carries out turning movements, as compared with when the robot 1 carries out straight-line movements. In other examples, the ground-contacting portion might, for instance, include a wheel or other rolling element. Such a rolling element might, for example, be rotatably mounted about an axis that is radially offset from and circumferentially directed with respect to the cleaning assembly axis.

FIG. 8 also indicates further details of the cleaning portion 10 of the cleaning assembly 19. Specifically, in the example shown in the drawing, the cleaning portion 10 is made up of a number of elongate scraping elements 24, each of which is in the form of a blade having two opposing edges used to scrape detritus off the housing 9. As illustrated in FIG. 8, the elongate scraping elements 24 are circumferentially arrayed about the cleaning assembly axis 31.

Referring now to FIG. 9, there it is clearly shown that the ground-facing side of the housing 2 is generally concave, so as to define an at least partially-enclosed space 20 between the ground and the robot during mowing. As may be seen from FIGS. 6 and 7, the cleaning portion 10 of the cleaning assembly 19 and the grass cutting blade 12 are disposed within this space 2. As is apparent, the cleaning portion 10 removes detritus from the surface of the ground-facing side of the housing.

As may also be seen from FIG. 9, in the particular example shown the portion of the housing that defines this space 2 is generally bowl shaped. It is also apparent from FIG. 9 that the cleaning assembly 19 is also generally bowl shaped.

In the particular example shown in FIGS. 6 to 9, the mowing deck 9 provides the majority of the ground-facing side of the housing 2, with the partially-enclosed space 20 being defined by a hollow within the mowing deck 9. As is apparent from FIG. 7, the shape of the cleaning portion 10 is complementary to that of the hollow within the mowing deck 9.

Figure 10A:
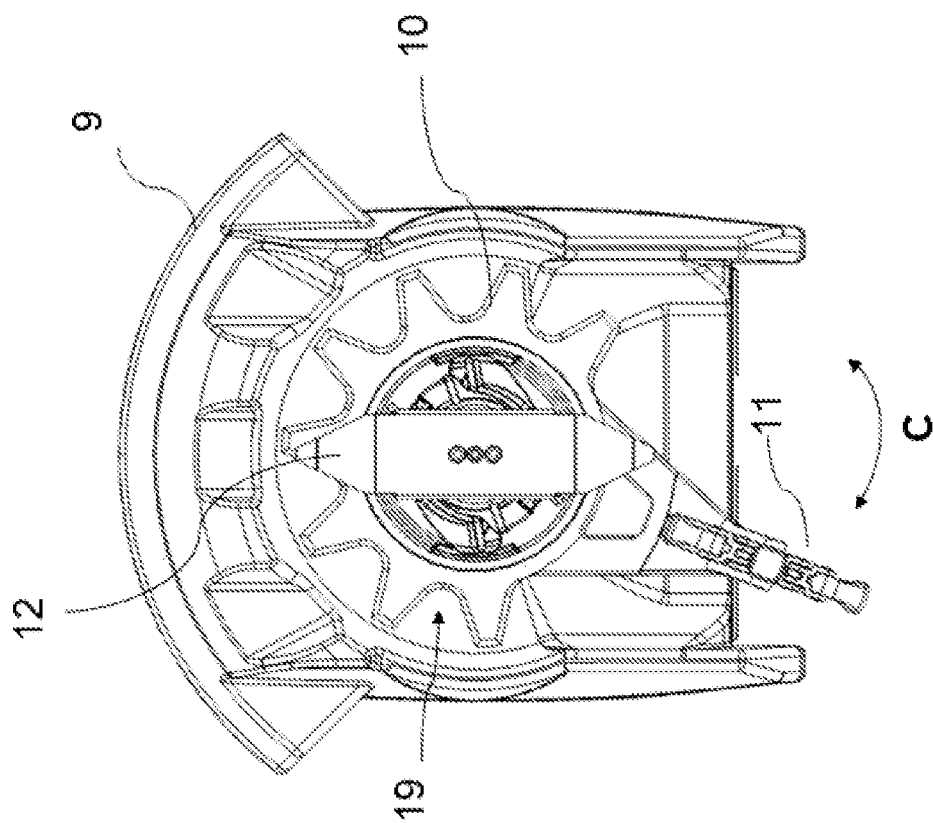
FIG. 10a is a perspective view of the cleaning assembly in a first position with respect to the housing of the robot of FIGS. 2 to 7.
Figure 10B:
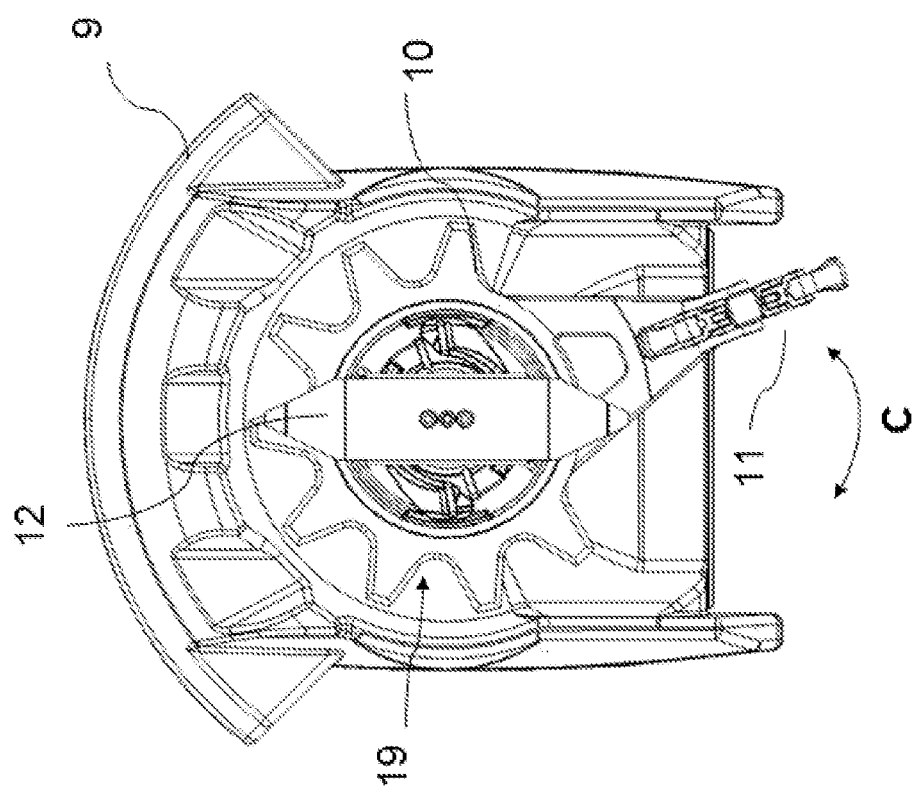
FIG. 10b is a perspective view of the cleaning assembly in a second position with respect to the housing of the robot of FIGS. 2 to 7.

Reference is now directed to FIGS. 10a and 10b, which show the cleaning assembly 19 in respective positions with respect to the housing 2 (specifically, with respect to the mowing deck 9) and therefore illustrate the movement of the cleaning assembly 19 with respect to the housing 2. As may be appreciated, the grass cutting blade and the cleaning assembly are rotatable independently of one another. The housing 2 and the cleaning assembly 19 are configured such that movement of the passive cleaning assembly with respect to the housing is limited to a specific range (indicated by arrow C in FIGS. 10a and 10b).

In more detail, in the particular example shown in FIGS. 6 to 9, and 10a and 10b, this is accomplished by the provision of co-operating limiting features 14 and 15 on each of the cleaning assembly 19 and the housing 2, specifically, on the mowing deck 9. The co-operating limiting features 14 and 15 are shown clearly in FIGS. 8 and 9. As is apparent, the co-operating limiting features 14 and 15 restrict rotation of the cleaning assembly 19 to a particular angular range C with respect to the mowing deck 9 (and therefore the housing 2 more generally). This motion over a limited range is considered to be particularly effective at cleaning the housing of debris. Where the movement of the cleaning assembly with respect to the housing is limited to an angular range, the motion of the cleaning assembly may, for example, be described as being substantially oscillatory or reciprocating.

In the particular example shown in FIGS. 6 to 9, such limitation of the movement of the cleaning assembly with respect to the housing results in the ground contacting portion staying generally in the same location, namely, towards the rear of the lawnmower.

As illustrated in FIGS. 10a and 10b, the limiting element may be adapted to limit the rotation of the cleaning assembly to a particular angular range. In some cases, suitable angular ranges may be less than 90 degrees, less than 60 degrees, or less than 45 degrees.

In the particular example shown, the limiting features are a protrusion 15 on the surface of the cleaning portion 10 and a limiter groove 14 on the mowing deck 9. The protrusion 15 slides within the groove 14, with the ends of the groove defining the limits of the angular range within which the cleaning assembly 19 may move with respect to the mowing deck 9. The angular range within which the cleaning assembly 19 is permitted to move might, for example, be less than 90 degrees, less than 60 degrees, or less than 45 degrees.

It will of course be understood that the limiting groove could instead be provided on the cleaning portion 10 (or on the cleaning assembly 19 more generally) and the protrusion provided on the mowing deck 9 (or the housing 2 more generally). Moreover, it will be understood that a variety of other limiting features might be used instead.

More generally, while in the example shown in FIGS. 6 to 9, and 10a and 10b the cleaning assembly includes a ground-contacting portion, this is not essential. Thus, in other examples, movement of the lawnmower with respect to the ground may cause the cleaning portion of the passive cleaning assembly to move with respect to the housing (and thereby remove detritus from the housing) as a result, for instance, of the momentum of the cleaning assembly. In such examples, the cleaning assembly might include suitable counterweights.

Further, while in the example shown in FIGS. 6 to 9, and 10a and 10b the cleaning assembly is rotatably mounted on the housing, this is not essential. Thus, in other examples, the cleaning assembly might, for example, be slidably mounted on the housing. Moreover, it should be understood that it is not essential for the cleaning assembly to be rotatably mounted on the housing in order that turning movements of the lawnmower cause the cleaning portion to move with respect to the housing: this could instead be accomplished using such slidably mounted cleaning assemblies.

Furthermore, while in the example shown in FIGS. 6 to 9, and 10a and 10b the cleaning portion 10 of the passive cleaning assembly 19 does not move with respect to the housing 2 when the lawnmower 1 moves along a straight line (forwards or backwards) this is of course not essential. For instance, the cleaning assembly might be configured such that substantially all movements of the lawnmower with respect to the ground cause the cleaning portion to move with respect to the housing and thereby remove detritus from the housing. Alternatively, the cleaning assembly might be configured such that only straight-line movements of the lawnmower (and not turning movements) with respect to the ground cause the cleaning portion to move with respect to the housing and thereby remove detritus from the housing.

While the foregoing section of the disclosure has made reference to a robotic lawnmower, it is considered that the same principles may be applied to conventional lawnmowers.

Scraping Cleaning Assembly

While in the previous section and in the example shown in FIGS. 6 to 9, and 10a and 10b the cleaning assembly is described and shown as being a passive cleaning assembly, with movement of the lawnmower with respect to the ground causing a cleaning portion of the passive cleaning assembly to move with respect to the housing and thereby remove detritus from the housing, the inventors consider that it may be beneficial to provide a robotic lawnmower with a cleaning assembly where a scraping edge of a cleaning portion of the cleaning assembly is moved with respect to the housing, thereby scraping detritus off the housing—regardless of whether the cleaning assembly is passive or active (i.e. electrically powered).

Thus, the inventors envisage providing a robotic lawnmower including a housing and a cleaning assembly for removing detritus from the housing, with the cleaning assembly being moveably mounted on said housing, and with the robot being configured such that, during use, the cleaning assembly is moved with respect to the housing thereby causing a scraping edge of a cleaning portion of the cleaning assembly to move with respect to the housing and thereby scrape detritus off the housing. In some embodiments the housing may be generally or substantially bowl shaped. In some embodiments it also envisaged that the cleaning assembly may be generally or substantially bowl shaped.

An example of a robotic lawnmower according to this concept is the robotic lawnmower 1 shown in FIGS. 6 to 9, and 10a and 10b. As discussed in the previous section, during use of this robotic lawnmower, the cleaning assembly 19 is moved with respect to the housing 2 as a result of the ground-contacting portion 11 contacting the ground during use. This in turn causes a number of scraping edges of the cleaning portion 10 of the cleaning assembly 19 to move with respect to the housing 2 and thereby scrape detritus off the housing 2.

However, a further example according to this concept might, for example, omit the ground contacting portion 11 of the robotic lawnmower shown in FIGS. 6 to 9, and 10a and 10b, with movement of the cleaning assembly being actively driven by a motor provided within the housing 2. (Of course, the ground contacting portion 11 could also be retained, with such a motor being included in addition.)

The principles of operation of the cleaning portion 10 of the cleaning assembly 19 described with reference to FIGS. 6 to 9, and 10a and 10b may equally apply to this concept. Thus, for example, each scraping edges may have a shape that is complementary to the shape of the portion of the housing from which they remove detritus.

As mentioned above, in the particular example of FIGS. 6 to 9, and in particular FIG. 8, the cleaning assembly is generally or substantially concave so as to define a second at least partially enclosed space. The grass cutting blade is disposed within the second partially enclosed space. That is to say, in some embodiments the grass cutting blade is generally or substantially enclosed by the generally bowl shaped cleaning assembly. As an example, FIG. 8 shows that the scraping elements 24 are elongate and extend along arc-shaped paths to form the generally bowl shaped enclosure. As shown in FIGS. 6-9, and in particular shown in FIG. 8, elongate scraping elements may be circumferentially arrayed, and may enclose a space between the cleaning assembly and the ground during mowing. The grass cutting blade may be disposed within this space.

Having a cleaning assembly that encloses the grass cutting blade may have the effect that all of the cuttings, and any additional matter thrown up by the blade will be thrown into the space enclosed by the cleaning assembly. This may help ensure that the lawnmower, and especially the space enclosed by the cleaning assembly is thoroughly cleared of debris. The bowl shape of the cleaning assembly, and of the housing may also ensure that there are fewer corners or nooks in which any debris may fall so that it becomes stuck. Nonetheless, the concept of providing a robotic lawnmower with a cleaning assembly where a scraping edge of a cleaning portion of the cleaning assembly is moved with respect to the housing, thereby scraping detritus off the housing, is by no means limited to the scraping edges being provided by a cleaning portion 10 according to the specific design shown in FIGS. 6 to 9, and 10a and 10b: a wide variety of alternative constructions providing scraping edges may be employed.

While the foregoing section of the disclosure has made reference to a robotic lawnmower, it is considered that the same principles may be applied to conventional lawnmowers.

Sliding Member

Referring once more to FIG. 6, it is apparent that the robotic lawnmower 1 includes a sliding member 8 in addition to two driven wheels 5*a*, 5*b* for moving the lawnmower 1 over the lawn.

This sliding member 8 has a ground-engaging surface 13 that is positioned so as to face towards and to slide over the ground during such movement of the lawnmower 1 over the lawn. The ground-engaging surface 13 may, as shown in FIG. 6, extend generally parallel to the surface of the ground.

As is also apparent from FIG. 6, the sliding member 8 and the two driven wheels are positioned at opposing ends of the lawnmower. The sliding member 8 and the two driven wheels 5*a*, 5*b* support respective portions of the robot's weight.

The inventors envisage that such an arrangement may be employed regardless of whether the other features of the robotic lawnmower described above with reference to FIGS. 2 to 8 are included, such as the cleaning assembly.

Accordingly, the inventors envisage providing a robotic lawnmower comprising: two driven wheels for moving the lawnmower over the lawn; and a sliding member having a ground-engaging surface that is positioned so as to face towards and to slide over the ground during such movement of the lawnmower over the lawn; wherein the sliding member and the two driven wheels are positioned at opposing ends of the lawnmower such that the sliding member and the two driven wheels support respective portions of the robot's weight.

Such a robotic lawnmower may be simple and inexpensive to manufacture and may allow for the robot to be made in a compact design. In contrast, robotic lawnmowers with castor wheels (in addition to drive wheels), may be relatively more expensive to manufacture and/or may result in larger robot constructions. Moreover, in comparative testing carried out by the Applicant the castors wheels of such robots are typically much more prone to falling into holes or hollows in the ground, thus impacting upon the reliability and/or efficiency of such robots.

Returning to FIG. 6, it can be seen that the particular sliding member 8 shown therein is adapted to contact the ground over a larger area than each of the wheels 5*a* and 5*b*. A robot with such a sliding member 8 may be particularly stable, while retaining maneuverability. This relatively large contact area of the sliding member may also reduce the risk of the sliding member 8 becoming stuck in holes or hollows in the ground, as compared with, for example, a castor wheel.

In some embodiments, the sliding member may contact the ground over an area of at least 40 cm$^2$ and preferably at least 50 cm$^2$]. A sliding member with such an area may also apply less pressure to the ground, and particularly to the grass after it has been cut, thus keep the grass in better condition. It may also sit on the grass which, after being cut, should be at substantial the same height, and therefore ensure the stability of the lawnmower further. Sliding members of alternative embodiments may also have a similar area.

As may also be seen from FIG. 6, the sliding member 8 is located at the rear of the lawnmower 1 with respect to its forwards direction of movement (F). However, this is not essential for the implementation of the general concept identified above; thus, in other cases the sliding member 8 might, for example, be located at the front of the lawnmower 1. Indeed, in some constructions, the robot may be more maneuverable when moving in the direction of the end at which the sliding member 8 is located.

Accordingly, for some applications it might be appropriate to define this direction within the robot's programming as being the forwards direction. In addition, the robot may be more effective at cutting longer grass when moving in the direction of the end at which the sliding member 8 is located.

Figure 11:
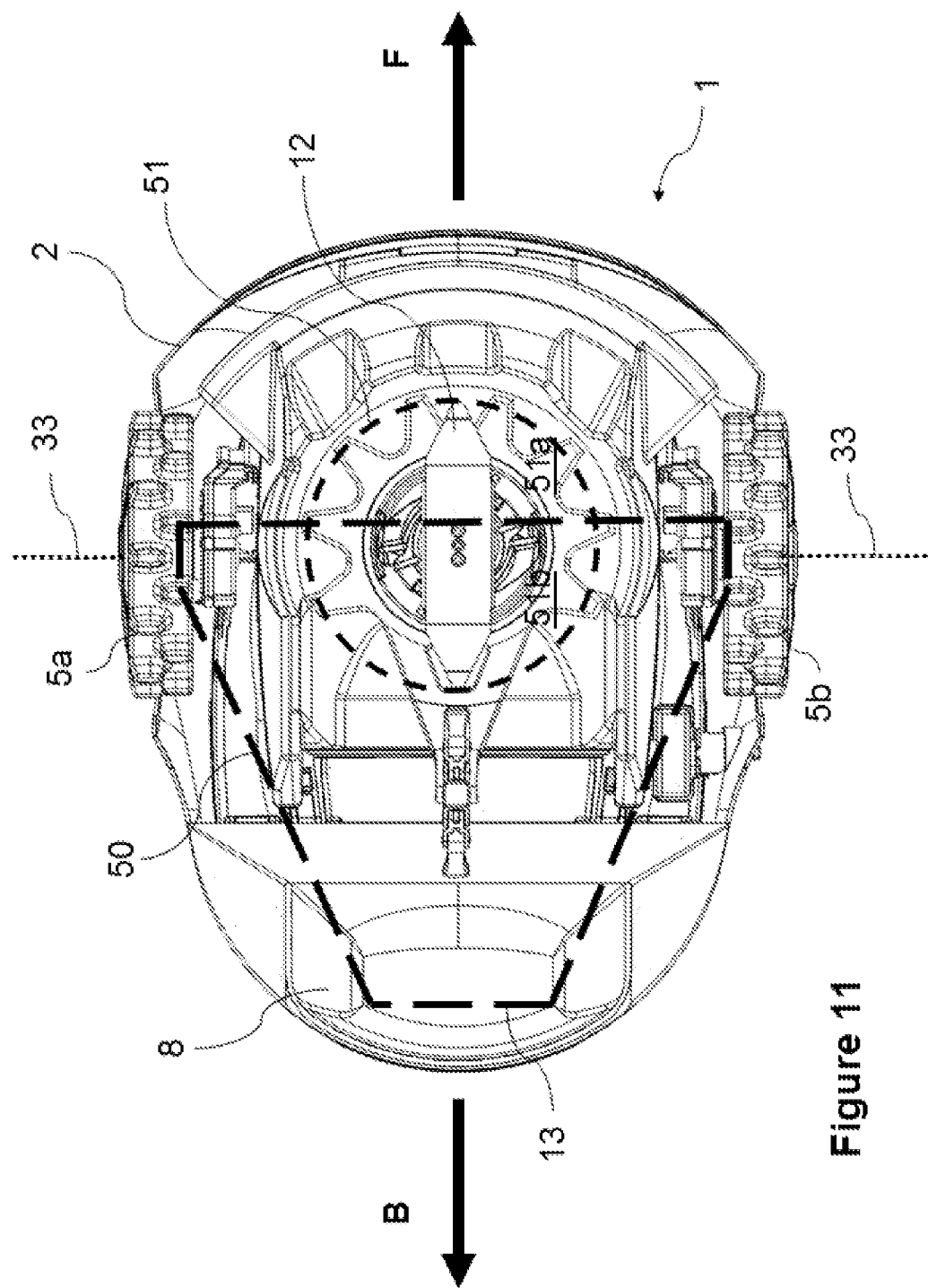
FIG. 11 is a plan view of the underside of the robot of FIGS. 2 to 7, illustrating the arrangement of the robot's cutting blade with respect to its wheels and sliding member.

As may be seen in FIGS. 6 and 11, the portions of the sliding member 8 adjoining the ground-engaging surface 13 are rounded. This may aid the smooth sliding of the ground-engaging surface 13 over the ground.

The sliding member 8 may be mounted on the housing 2 of the robot 1 such that there is no significant change in the orientation of the sliding member 8 (and therefore the ground-engaging surface 13 also) with respect to the housing 2 as the ground-engaging surface 13 slides over the ground. However, as will be discussed in further detail below, the mounting of the sliding member 8 on the housing 2 may allow for some movement of the sliding member relative to the housing.

FIG. 11, which is a plan view of the underside of the robot of FIGS. 2 to 6, illustrates clearly the relative disposition of the sliding member 8 and the wheels 5*a*, 5*b*. As may be seen, the wheels 5*a*, 5*b* are spaced apart along a wheel axis 33 and the sliding member 8 (and therefore the ground-engaging surface 13 also) is located mid-way between the wheels 5*a*, 5*b* with respect to the wheel axis 33 while being offset from it.

As may also be seen from FIG. 11, the sliding member 8 is shaped such that the ground-engaging surface 13 is elongate in a direction parallel to the wheel axis 33. This may provide lateral stability to the robot 1.

As stated above, the sliding member 8 and the two driven wheels 5*a*, 5*b* support respective portions of the robot's weight (and indeed, in some cases, they may together support substantially all of the robot's weight). Hence, or otherwise, the centre of mass of the lawnmower may lie between the two driven wheels and the sliding member.

Suitable balancing of the amounts of these portions of the robot's weight may improve the performance of the robot. For instance, because the sliding of the ground-contacting surface 13 over the lawn may contribute significantly to the friction experienced by the robot while moving (given that the sliding member 8 is neither actively driven or able to roll on the surface of the lawn) it may be appropriate for the robot's weight to be balanced such that the portion of the weight supported by the sliding member 8 is less than the portion of the weight supported by the two driven wheels 5*a*, 5*b*.

Testing carried out by the Applicant suggests that, because the grass of a lawn is relatively "soft", the friction provided by the sliding member 8 may be roughly proportional to the pressure exerted by the sliding member (through the ground-contacting surface 13) on the grass. Tests carried out by the Applicant suggest that efficient movement may be experienced where the pressure is less than 35 g/cm$^2$ and, in some cases, less than 25 g/cm$^2$. In addition, or instead, a lower pressure may result in the lawn being less squashed/compressed by the sliding member than an alternative ground contacting portion such as a caster or driven wheel.

In other cases, the friction provided by the sliding member 8 may be roughly proportional to the weight supported by the sliding member 8. Tests carried out by the Applicant suggest that efficient movement may be experienced where the weight supported by the sliding member is less than 3 kg, in some cases less than 2.5 kg and, in particular, less than 2 kg.

Conversely, for stable movement over the lawn (avoiding, for instance, the robot bouncing up and down on its sliding member 8 when travelling over bumps or hollows in the lawn), the sliding member 8 should support at least some of the weight of the robot. Tests with prototypes suggest that where the sliding member 8 supports at least 15% of the weight of the robot, stable movement may be experienced (though this is by no means essential and certain robots where the sliding member 8 supports less than 15% of the robot's weight may experience reasonably stable movement). Improvements in stability were seen where the sliding member 8 supports at least 20% of the weight of the robot.

As briefly mentioned above with reference to FIG. 1, the power system 200 of the robot of FIGS. 2 to 6 may include a rechargeable power source. While in the description above with reference to FIG. 1 and to FIGS. 4 and 5 it was proposed that the power system 200 would include charging contacts (e.g. provided within holes at either end of slot 7) for connection to an external power source (e.g. provided at a docking station), it is envisaged that the power system may instead (or perhaps in addition) include a wireless power receiver: a receiver that does not require a direct electrical connection to a power supply in order to receive electrical power. The wireless power receiver may be configured to wirelessly receive electrical power from a wireless power transmitter external to the robot (for example located in a docking station) and to thereby charge the rechargeable power source.

In addition, it is considered that such a wireless power receiver may conveniently be located (at least partially) within the sliding member 8. This arrangement may allow the robot to charge its internal power source at a suitably configured docking station by simply resting the ground engaging surface 13 of the sliding member 8 on top of a surface of the charging station that includes a wireless power transmitter.

The efficiency of wireless power transmission is in general limited by the cross-sectional area presented by the wireless power receiver to the wireless power transmitter and/or the proximity of the wireless power receiver to the wireless power transmitter. By locating the wireless power receiver within the sliding member 8, one or both of these limiting factors may be addressed: as the wireless transmitter will be in proximity to the generally large area of the (externally facing) ground-contacting surface 13, it may therefore present a large cross-sectional area to the exterior of the robot and therefore potentially to the wireless power transmitter; in addition, the proximity of the wireless transmitter to the ground-contacting surface 13 implies that the wireless transmitter will be in proximity to the exterior of the robot and therefore potentially the wireless transmitter. For the same reasons, it may be particularly beneficial to locate the wireless power receiver adjacent to the ground-engaging surface 13.

The wireless power receiver may be configured for any appropriate wireless power transfer technology, such as inductive coupling, resonant inductive coupling, capacitive coupling and the like. In many cases, the wireless power receiver may include a coil, for example an induction coil. In order to provide a large cross-section for receiving the wireless power signal transmitted by the wireless power transmitter, this coil may be arranged such that its axis is normal to the ground-engaging surface 13.

Of course, it should be understood that the inclusion of such a wireless power receiver is purely optional and that charging contacts could instead be utilised.

Arrangement of Ground Contacting Members and Blade

As discussed above, the robot shown in FIGS. 2 to 6 includes a pair of drive wheels 5a, 5b spaced apart along a wheel axis 33 and a sliding member 8. As also discussed above, the drive wheels 5a, 5b and the sliding member 8 all contact the ground so as to support the housing 2 above the ground. The wheels 5a, 5b are driven so as to rotate about the wheel axis 33, thereby propelling the lawnmower 1 over the ground.

FIG. 11, which is a plan view of the underside of the robot of FIGS. 2 to 6, illustrates the arrangement of the robot's cutting blade 12 with respect to the driven wheels 5a, 5b and the sliding member 8. As the drawing shows, the grass cutting blade 12 is driven by the lawnmower so as to move with respect to the housing, thereby sweeping out a corresponding cutting area (indicated by dashed circle 51) beneath the housing 2.

The drawing also indicates in dashed line the polygonal footprint 50 defined by the ground-contacting members of the robot, which are those elements that support the housing 2 above the ground: in the particular example shown, driven wheels 5a, 5b and sliding member 8. More particularly, if each of the ground-contacting members is regarded as contacting the ground over a respective ground contact region, the ground contact footprint 50 may then considered as being defined by the polygon bounding all of these ground contact regions. As will be apparent, the polygon defining the ground contact footprint 50 takes a straight-line path between the ground contacting regions.

As FIG. 11 shows, a part 51a of the cutting area 61 for the cutting blade 12 lies beyond the perimeter of the ground contact footprint 50. Conversely, the remaining part 51b of the cutting area 51 for the cutting blade 12 lies within the perimeter of the ground contact footprint 50.

Such an arrangement of the cutting area of the blades with respect to the ground contact footprint 50 may enable the robot to mow all the way to the edge of the lawn with little risk that the robot will fall off the edge of the lawn, since the ground contacting members may remain a safe distance from the edge of the lawn (or at least on the lawn) while the cutting blade cuts an area that extends up to or beyond the edge of the lawn.

In the particular arrangement illustrated in FIG. 11, the part 51a of the cutting area 51 that lies beyond the perimeter of the ground contact footprint 50 is at the front of the lawnmower with respect to its forwards direction of movement (indicated by F in the drawing). This may enable the robot to safely cut to the edge of the lawn where it approaches in the forwards direction.

Furthermore, FIG. 11 illustrates that the driven ground contacting members (which in the particular example shown in FIGS. 2, 3, 4, 5, 6 and 11 are wheels) may be in front of the non-driven ground contacting members (which in the particular example shown in FIGS. 2, 3, 4, 5, 6 and 11 is a sliding member) relative to the direction of forwards movement, F. Having the driven ground contacting members positioned forwards of the non-ground contacting members in the direction of forward motion may reduce the risk of the driven ground contacting members moving outside of the boundary of the lawn when mowing right up to the boundary.

Figure 12:
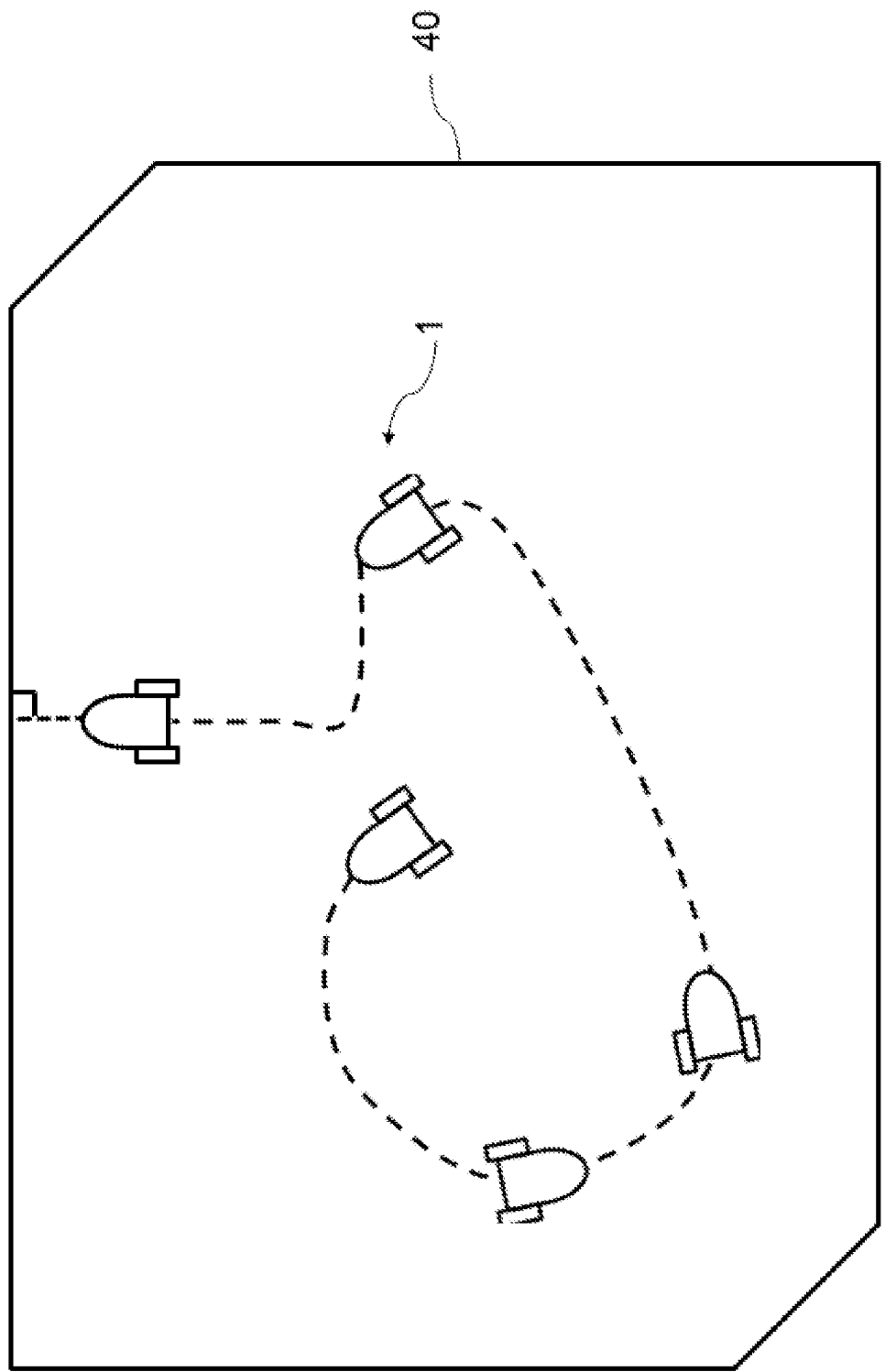
FIG. 12 is a schematic view of the robot of FIGS. 2 to 7 when moving around a working area according to a movement pattern described herein.

Moreover, as illustrated in FIG. 12, the robot 1 (e.g. the control system 100 thereof) may be specifically programmed such that, when its navigation system 300 indicates that it is in the vicinity of the boundary 40 of its working area (e.g. part of, or the whole of the lawn) and it is approaching the boundary 40, it arrives at the boundary at a predetermined angle with respect to the nearest part of the boundary, for instance by carrying out a turning movement. In the particular example shown in FIG. 12, this predetermined angle is 90 degrees. However, in other arrangements (for example as a result of different blade arrangements), a different predetermined angle might be defined within the robot's programming. In many cases, however, the predetermined angle will be at least 45 degrees and, often, at least 60 degrees, so that the robot arrives at the boundary moving generally forwards, as opposed to moving parallel to the boundary.

Hence, or otherwise, the robot may be programmed such that, upon the navigation system indicating that the robot is in the vicinity of the boundary and is approaching the boundary, it moves along a path that is calculated such that the parts of the cutting areas beyond the ground contact footprint are applied all the way to (and in some cases over) the boundary, but without the ground-contacting members crossing the boundary.

Having moved along a path, such as that shown in FIG. 12, that takes the robot up to the boundary of the area, the robot may then reverse away from the boundary (for example by driving the wheels in the opposite rotational sense). Such a movement pattern may be contrasted with those where the robot is moving parallel to the boundary at its point of closest approach.

The navigation system may suitably include a number of boundary distance sensors for estimating the robot's current distance from the boundary. As discussed above in the "Overview" section, examples of such sensors include: coils for sensing a magnetic field that is induced by a wire loop, which delimits the area and transmits an alternating current; range finders, such as ultrasonic or laser range finders, which can measure a distance from a hard delimiter such as a fence or wall; 2D or 3D machine vision systems that can evaluate a distance to marked or natural delimiters (for example, a grass-classifying algorithm may be used to determine the edge of the lawn).

Of course, the navigation system could in addition or instead rely on sensors operable to sense the relative motion of the robot and/or sensors operable to determine the robot's absolute position within the area. In such cases, information defining the boundary (e.g. co-ordinates) may be stored by the robot. The control system 100 may then reference this information so as to determine how far its current position (as determined by the navigation system 300) is from the boundary.

The approach illustrated in FIG. 12 may be contrasted with that described in EP2806325A, where the robot may carry out a gradual turn where, at the closest approach distance to the boundary, it is moving tangentially of the boundary. Nonetheless, a number of the techniques disclosed in EP2806325A might be applied to a movement pattern as shown in FIG. 12, where the robot 1 arrives at the boundary moving perpendicular to the boundary 40.

The robot shown in FIGS. 2-11 is particularly suited to movement in both forwards and rearwards directions. This is because, as viewed from vertically above the lawnmower 1, the ground contacting portion of the mowing deck 9 is located on one side of the wheel axis 33 and the ground-engaging surface 13 of the sliding member 8 is located on the opposite side of the wheel axis. In the particular example shown, these features are indeed located at opposite ends of the lawnmower 1 (again, when viewed from vertically above the lawnmower 1), specifically, at the forwards and rearwards ends. With such an arrangement, the sliding member 8 may enable the moveably suspended mowing deck 9 to set the mowing height particularly effectively, enabling the lawnmower 1 to deal with tall grass when moving either forwards or backwards.

A further feature of the robot of FIGS. 2-11 that assists with moving forwards and rearwards, is that the grass cutting blade is arranged such that the axis of rotation of each grass cutting blade substantially intersects with the wheel axis 33. This may, for example, allow the drive motor for the grass cutting blade to be supported above the wheel axis 33, balancing the weight of the robot whether moving forwards or backwards. Of course, the same feature may be implemented regardless of whether the robot is programmed to regularly move both forwards and backwards.

While in the arrangement shown in FIG. 10 only one grass cutting blade is employed, it should be understood that multiple grass cutting blades might be provided, with each sweeping out a respective cutting area beneath the housing. In such a case, the cutting blades may be arranged so that at least part of one or more of these cutting areas (and in some cases each of these cutting areas) is beyond the perimeter of the ground contact footprint.

More generally, while the robot shown in FIGS. 2-6 and 11 is propelled over the ground by drive wheels 5a, 5b it is considered that continuous tracks or some other type of drive ground-contacting members might be used instead. Thus the drive wheels described above should be understood as an example of ground-contacting members that are driven so as to move relative to the housing and to the ground thereby propelling the lawnmower over the ground.

In addition, while the robot shown in FIGS. 2-6 and 11 includes the sliding member 8, it is considered that any suitable type of ground-contacting member could be substituted, whether passive, such as a castor wheel, or other freely rolling member, or actively driven, such as further driven wheels, continuous tracks and the like.

The applicant therefore views the robot of FIGS. 2-6 and 11 as being a specific example of the much more general concept, whereby there is provided a robotic lawnmower comprising: a housing; a plurality of ground-contacting members, which during use each contact the ground over a ground contact region, the ground-contacting members thereby supporting the housing above the ground, at least some of said ground-contacting members being driven so as to move relative to the housing and to the ground thereby propelling the lawnmower over the ground, a ground contact footprint being defined by the polygon bounding all of said ground contact regions; and at least one grass cutting blade, each of which is driven by the lawnmower so as to move with respect to the housing, thereby sweeping out a respective cutting area beneath the housing; wherein at least part of one or more of the cutting areas is beyond the perimeter of said ground contact footprint.

Combinations

It is envisaged that the concepts discussed above may be combined in a variety of ways within a robotic lawnmower.

For example, concepts disclosed in the "Arrangement of the ground contacting members and blade" section may be implemented in a robotic lawnmower in combination with the concepts disclosed in the "Sliding Member" section. Furthermore, any or all of the concepts disclosed in the "Sliding Member" and "Arrangement of the ground contacting members and blade" sections may be implemented in a robotic lawnmower in combination with either of the concepts disclosed in the "Passive Cleaning Assembly" and "Scraping Cleaning Assembly".

Of course, it will be appreciated that these are only examples; still further combinations are envisaged.

More generally, it should be appreciated that other examples and variations are contemplated within the scope of the appended claims.

It should be noted that the foregoing description is intended to provide a number of non-limiting examples that assist the skilled reader's understanding of the present invention and that demonstrate how the present invention may be implemented.

The invention claimed is:

1. A lawnmower comprising:
   a housing; and
   a passive cleaning assembly for removing detritus from the housing, the passive cleaning assembly being moveably mounted on said housing, wherein the passive cleaning assembly further comprises a ground-contacting portion, which contacts the ground during use, thereby causing said cleaning portion to move with respect to the housing during movement of the lawnmower;
   wherein movement of the lawn mower with respect to the ground causes a cleaning portion of the passive cleaning assembly to move with respect to the housing and thereby remove detritus from the housing;
   wherein the ground-contacting portion comprises at least one articulated chain, which contacts the ground during movement of the lawnmower; and
   wherein each chain comprises a plurality of links, each link being pivotally coupled to the next in the chain so as to permit rotation about a respective axis, the link axes for all of the links within a chain being parallel.

2. The lawnmower of claim 1, wherein turning movements of the lawnmower cause the cleaning portion to move with respect to the housing and thereby remove detritus from the housing.

3. The lawnmower of claim 1, wherein the passive cleaning assembly is rotatably mounted on the housing, such rotation being about a cleaning assembly axis.

4. The lawnmower of claim 3, wherein the cleaning assembly axis is substantially normal to the ground.

5. The lawnmower of claim 1, further comprising a grass cutting blade, which is driven by the lawnmower so as to rotate with respect to the housing about a blade axis, wherein the passive cleaning assembly is rotatably mounted on the housing about a cleaning assembly axis, and wherein the blade axis is substantially aligned with the cleaning assembly axis.

6. The lawnmower of claim 5, wherein the housing has a ground facing side, which is generally concave, so as to define an at least partially-enclosed space between the ground and the lawnmower during mowing, the cleaning portion and the blade being disposed within said space, wherein the cleaning portion removes detritus from at least a portion of the surface of said ground-facing side.

7. The lawnmower of claim 1, wherein the ground-contacting portion is configured such that an amount of friction between the ground-contacting portion and the ground is substantially greater when the lawnmower carries out turning movements, as compared with when the lawnmower carries out straight-line movements.

8. The lawn mower of claim 1, wherein the ground-contacting portion is adapted to contact the ground at the rear of the lawnmower with respect to its forward direction of movement.

9. The lawnmower of claim 1, wherein the passive cleaning assembly is rotatably mounted on the housing, such rotation being about a cleaning assembly axis, and wherein each articulated chain is pivotally coupled to the remainder of the cleaning assembly, so as to permit rotation about an axis that is radially offset from and circumferentially directed with respect to said cleaning assembly axis and that is parallel to the axes of rotation of its links.

10. The lawnmower of claim 9, wherein there are provided a plurality of said articulated chains and wherein all of the articulated chains are pivotally coupled to the remainder of the cleaning assembly, so as to permit rotation about a common axis.

11. The lawnmower of claim 1, further comprising a limiting element configured to limit the movement of the passive cleaning assembly with respect to the housing to a defined range.

12. The lawnmower of claim 1, wherein the cleaning portion comprises a plurality of elongate scraping elements.

13. The lawnmower of claim 12, wherein each scraping element is shaped as a blade having two opposing edges, which are each configured to scrape detritus off the housing.

14. The lawnmower of claim 12 wherein the passive cleaning assembly is rotatably mounted on the housing, such rotation being about a cleaning assembly axis, and wherein the plurality of elongate scraping elements are circumferentially arrayed about the cleaning assembly axis.

15. The lawnmower of claim 1, wherein the lawnmower is a robotic lawnmower.

16. A lawnmower comprising:
   a housing;
   a cleaning assembly for removing detritus from the housing, the cleaning assembly being moveably mounted on said housing, wherein the cleaning assembly is rotatably mounted on the housing, such rotation being about a cleaning assembly axis, and wherein the cleaning assembly axis is substantially normal to a ground surface; and
   a limiting element, wherein the limiting element is adapted to limit the rotation of the cleaning assembly with respect to the housing about the cleaning assembly axis to a particular angular range, which is preferably less than 90 degrees, more preferably less than 60 degrees, still more preferably less than 45 degrees;
   the lawnmower being configured such that, during use, the cleaning assembly is moved with respect to the housing thereby causing a scraping edge of a cleaning portion of the cleaning assembly to move with respect to the housing and thereby scrape detritus off the housing.

17. The lawn mower of claim 16, further comprising a grass cutting blade, which is driven by the lawnmower so as to rotate with respect to the housing about a blade axis, and wherein the blade axis is substantially aligned with the cleaning assembly axis.

18. The lawn mower of claim 17, wherein the grass cutting blade and the cleaning assembly are rotatable independently of one another.

19. The lawnmower of claim 17, wherein the housing has a ground facing side, which is generally concave and generally bowl shaped, so as to define an at least partially-enclosed space between the ground and the lawnmower during mowing, the cleaning portion and the blade being disposed within said space.

20. The lawnmower of claim 16, wherein the scraping edge of the cleaning portion scrapes detritus off at least a portion of the surface of said ground-facing side.

21. The lawnmower of claim 16, wherein the cleaning portion comprises a plurality of elongate scraping elements.

22. The lawnmower of claim 21, wherein each scraping element is shaped as a blade having two opposing edges, which are each configured to scrape detritus off the housing.

23. The lawnmower of claim 21 wherein the cleaning assembly is rotatably mounted on the housing, such rotation being about a cleaning assembly axis, and wherein the plurality of elongate scraping elements are circumferentially arrayed about the cleaning assembly axis.

24. The lawnmower of claim 16, further comprising at least one motor configured to move the cleaning assembly with respect to the housing.

25. The lawnmower of claim 16, wherein the lawnmower is a robotic lawnmower.

26. A lawnmower comprising:
   a housing;
   a cleaning assembly for removing detritus from the housing, the cleaning assembly being moveably mounted on said housing, wherein the cleaning assembly is rotatably mounted on the housing, such rotation being about a cleaning assembly axis, and wherein the cleaning assembly axis is substantially normal to a ground surface, the lawnmower being configured such that, during use, the cleaning assembly is moved with respect to the housing thereby causing a scraping edge of a cleaning portion of the cleaning assembly to move with respect to the housing and thereby scrape detritus off the housing; and
   a grass cutting blade, which is driven by the lawnmower so as to rotate with respect to the housing about a blade axis, and wherein the blade axis is substantially aligned with the cleaning assembly axis;
   wherein the housing has a ground facing side, which is generally concave and generally bowl shaped, so as to define an at least partially-enclosed space between the ground surface and the lawnmower during mowing, the cleaning portion and the blade being disposed within said space; and
   wherein the cleaning assembly is substantially concave and generally bowl shaped so as to define a second at least partially enclosed space, the grass cutting blade being disposed within the second partially enclosed space.

27. The lawnmower of claim 26, further comprising at least one motor configured to move the cleaning assembly with respect to the housing.

28. The lawnmower of claim 26, wherein the lawnmower is a robotic lawnmower.

29. The lawnmower of claim 26, wherein the cleaning assembly comprises a plurality of elongate scraping elements.

30. The lawnmower of claim 29, wherein each scraping element is shaped as a blade having two opposing edges, which are each configured to scrape detritus off the housing.

31. The lawnmower of claim 29, wherein the plurality of elongate scraping elements are circumferentially arrayed about the cleaning assembly axis.

* * * * *